(12) United States Patent
Dobbins

(10) Patent No.: US 7,212,467 B2
(45) Date of Patent: May 1, 2007

(54) SONAR LOCALIZATION

(75) Inventor: Peter Dobbins, Bristol (GB)

(73) Assignee: BAE Systems (Land and Sea Systems) Limited, Farnborough, Hampshire (GB)

(*) Notice: Subject to any disclaimer, the term of this patent is extended or adjusted under 35 U.S.C. 154(b) by 1306 days.

(21) Appl. No.: 10/247,849

(22) Filed: Sep. 13, 2002

(65) Prior Publication Data

US 2007/0053239 A1    Mar. 8, 2007

(30) Foreign Application Priority Data

Oct. 5, 2001    (GB) .................................. 0124046.4

(51) Int. Cl.
   *G01S 11/04* (2006.01)
(52) U.S. Cl. ...................................... 367/138; 367/905
(58) Field of Classification Search ................ 367/103, 367/138, 126, 123, 129, 905
   See application file for complete search history.

(56) References Cited

U.S. PATENT DOCUMENTS 4,965,776 A * 10/1990 Mueller ...................... 367/126

OTHER PUBLICATIONS

H.O. Berktay et al., "Nearfield effects in end-fire line arrays", The Journal of the Acoustical Society America, vol. 53, 1973, pp. 550-556.

* cited by examiner

*Primary Examiner*—Dan Pihulic
(74) *Attorney, Agent, or Firm*—Crowell & Moring LLP

(57) ABSTRACT

Described herein is sonar localization apparatus which comprises a plurality of acoustic transducers (6) arranged to define at least two end fire arrays (2, 4) each of which produces a sonar beam (10, 12) suitable for the detection of objects in the near field.

20 Claims, 1 Drawing Sheet

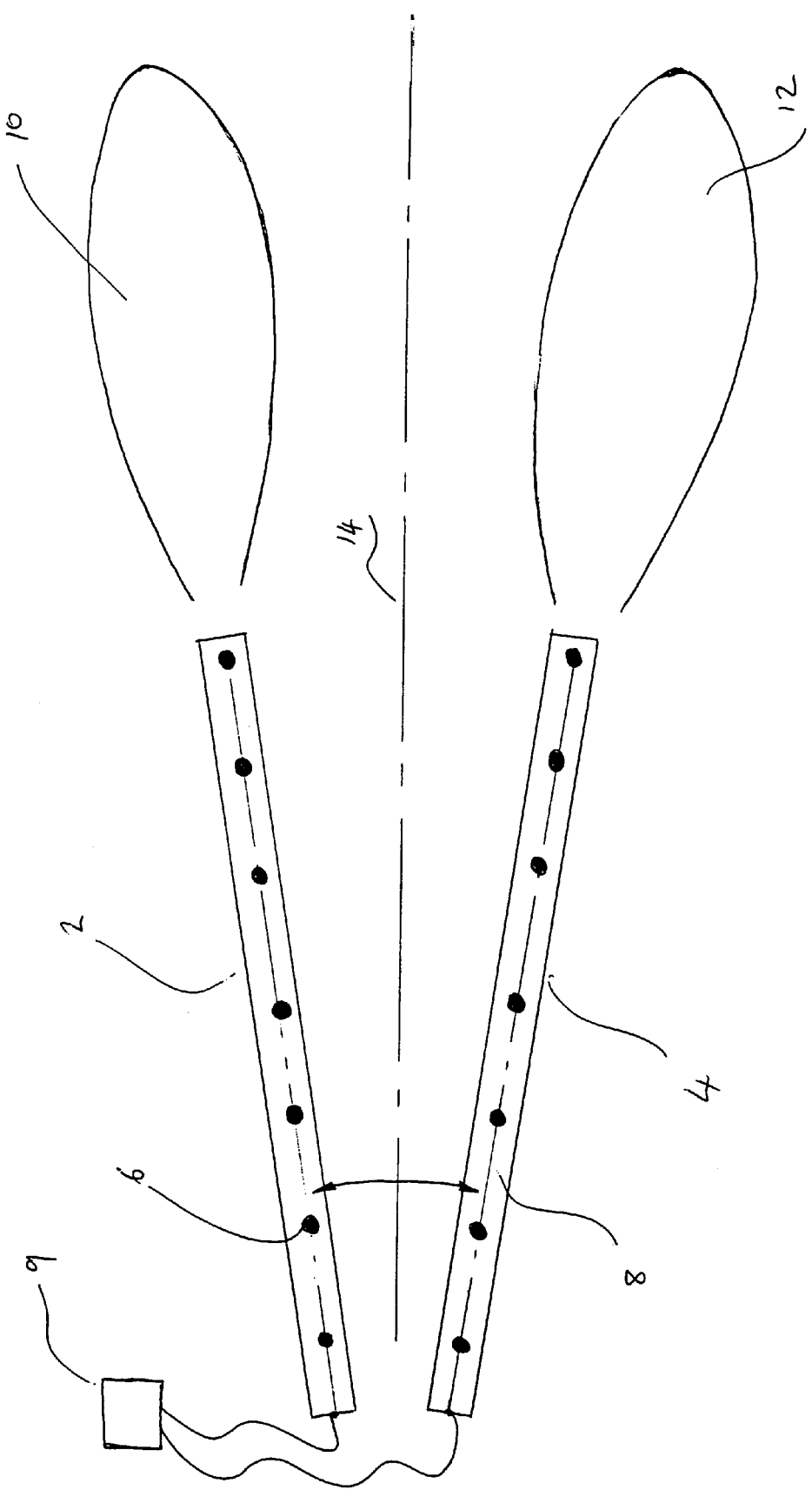

SONAR LOCALIZATION

This invention relates to the field of sonar and more particularly to the use of end fire arrays for the localisation of objects immersed in a fluid.

State of the art active sonar localisation techniques usually rely on the ability of a transducers to produce Omnidirectional acoustic signals, the reflections from which are received and processed thereby providing for both directional and range location of objects.

Typically arrays of transducers are utilised and acoustic signals may be steered or directed towards areas of interest by means of what is known in the art as electronic beam forming utilising for example a phased array of transducers. In terms of ship or submarine based sonar systems, the term 'broadside' or plane array is used to define an array comprised of transducer elements arranged on the 'side' of the vessel in question.

When using arrays of sonar transducers, the ability to accurately resolve received signals into directional and range information relies on the configuration of the elements of the array itself, along with the processing capability of the sonar system in question. However, as the range of an object from a sonar array reduces, the ability to resolve information becomes significantly more difficult due to the interrelationship of the beam patterns formed by a broadside or plane array.

Typically in a plane array beam overlap from an array of transducers occurs in the order of 3 decibels down stream from the plane of the array at which point the angle between the beams is roughly equivalent to the beam width.

In sonar applications where the accurate location of objects at close range is required, the current state of the art 'hand held' type systems are functionally limited to ranges determined by what are know in the art as 'near-field' effects. Such effects serve to limit the effective range of such devices to the order of meters away from the object and so typically such devices are used as secondary location devices, the primary 'close' location being conducted by hand or eye.

One particular form of acoustic array known as an 'end-fire' array has the ability to form 'beams' of acoustic signals with in the 'near-field', i.e. up to and including the position of the last transducer. A discussion of the 'near-field' effects of such an array can be found at the reference H. O. Berktay and J, A, Shooter, 'Nearfield Effects in Endfire Arrays', J. Acoust. Soc. Am.,53(2), 550–556.

The invention described herein provides apparatus and a method for utilising the properties of endfire arrays to produce a sonar based location system which provides for resolution of objects from distances significantly closer to the array that has been previously possible with no degradation in the functionality of the system in the far field.

In accordance with one aspect of the present invention, there is provided apparatus for the localisation of a objects immersed in a fluid, the apparatus comprising a plurality of acoustic transducers disposed in relation to each other so as to define at least two end-fire arrays, the physical relationship between said at least two end fire arrays producing an angular separation between the longitudinal axis of the acoustic beams produced by said end fire arrays and the angular separation of said beams providing for the angular positional resolution of objects located at distances from the end of said end fire arrays substantially less than the maximum width of said beams through to the far field.

In a preferred embodiment of the invention, said transducers comprise omnidirectional transducers.

In a yet further embodiment of the invention, the characteristics of the beam patterns from each end fire array are substantially identical.

In a still further embodiment of the invention, the beams by each end fire array are substantially symmetrical about the boresight axis.

In another further embodiment of the invention, the angle between the beams of each end fire array is substantially equivalent to the width of the beam so formed.

In accordance with further aspects of the present invention, the apparatus described above may be included in waterborne vessel, an underwater vessel or a hand held device.

In accordance with another aspect of the present invention, there is provided a method of providing the localisation of objects immersed in a fluid, the method comprising the steps of:— a) disposing a plurality of acoustic transducers in relation to each other so as to define at least two end-fire arrays; and b) producing an angular separation between the longitudinal axis of acoustic beams produced by said end fire arrays in accordance with the physical relationship between said at least two end fire arrays, the angular separation of said beams providing for the angular positional resolution of objects located at distances from the end of said end fire arrays which are substantially less than the maximum width of said beams through to the far field.

The invention described herein utilises the beam characteristics of two of more endfire arrays in order to measure the location of a target object from very close to the array through to the far field.

An example of a preferred embodiment of the invention is now given, by way of example only, with reference to the accompanying drawing, namely FIG. 1, which shows a diagrammatic representation of a pair of endfire arrays and their associated acoustic beam patterns being used in accordance with the invention.

FIG. 1 shows a pair of end fire arrays 2, 4, each being comprised of a plurality of omnidirectional acoustic transducers 6, each of said transducers 6 being held in a matrix material 8.

The function of the transducers is managed by the control means 9 which may be used to control characteristics such as frequency, power and duration, along with the ability to process signals received by transducers which are being used in receive mode and not transmit.

To provide the novel ability to offer range information close to the end of a pair of arrays 2, 4 used in accordance with the invention, it is preferable that the angle between the beams 10, 12 of the respective arrays 2, 4, is substantially equivalent to the width of the beam so formed. This provides the ability to produce a beam pattern enabling the accurate, non-distorted resolution of received sonar information relating to a target object.

Such sonar apparatus may be comprised in a hand held system for use underwater in close proximity to target objects or alternatively as part of a remotely controlled or automated system used for investigating objects underwater, including such objects laying on or buried under the sea bed.

The longitudinal axis along which the beams are directed is referred to in terms of the art of sonar location as the boresight 14, i.e. the direction of aim of the sonar beam.

Other advantages and improvements over state of the art system will be readily apparent to those skilled in the art and such embodiments and alternative embodiments which utilise the inventive concept of the disclosure contained herein are considered to be included within the scope of the claimed invention.

The invention claimed is:

1. Apparatus for the localisation of objects immersed in a fluid, the apparatus comprising a plurality of acoustic transducers disposed in relation to each other so as to define at least two end-fire arrays, the physical relationship between said at least two end fire arrays producing an angular separation between the longitudinal axis of the acoustic beams produced by said end fire arrays and the angular separation of said beams providing for the angular positional resolution of objects located at distances from the end of said end fire arrays which are substantially less than the maximum width of said beams through to the far field.

2. Apparatus according to claim 1, wherein said transducers comprise omnidirectional transducers.

3. Apparatus according to claim 1, wherein the characteristics of the beam patterns from each end fire array are substantially identical.

4. Apparatus according to claim 1, wherein the beams from each end fire array are substantially symmetrical about the boresight axis.

5. Apparatus according to claim 1, wherein the angle between the beams of each end fire array is substantially equivalent to the width of the beam so formed.

6. Apparatus according to claim 2, wherein the characteristics of the beam patterns from each end fire array are substantially identical.

7. Apparatus according to claim 2, wherein the beams from each end fire array are substantially symmetrical about the boresight axis.

8. Apparatus according to claim 3, wherein the beams from each end fire array are substantially symmetrical about the boresight axis.

9. Apparatus according to claim 6, wherein the beams from each end fire array are substantially symmetrical about the boresight axis.

10. Apparatus according to claim 2, wherein the angle between the beams of each end fire array is substantially equivalent to the width of the beam so formed.

11. Apparatus according to claim 3, wherein the angle between the beams of each end fire array is substantially equivalent to the width of the beam so formed.

12. Apparatus according to claim 4, wherein the angle between the beams of each end fire array is substantially equivalent to the width of the beam so formed.

13. Apparatus according to claim 6, wherein the angle between the beams of each end fire array is substantially equivalent to the width of the beam so formed.

14. Apparatus according to claim 7, wherein the angle between the beams of each end fire array is substantially equivalent to the width of the beam so formed.

15. Apparatus according to claim 8, wherein the angle between the beams of each end fire array is substantially equivalent to the width of the beam so formed.

16. Apparatus according to claim 9, wherein the angle between the beams of each end fire array is substantially equivalent to the width of the beam so formed.

17. A waterborne vessel comprising apparatus according to claim 1.

18. An underwater vessel comprising apparatus according to claim 1.

19. A hand held device comprising apparatus according to claim 1.

20. A method of providing the localisation of objects immersed in a fluid, the method comprising the steps of:—
   a) disposing a plurality of acoustic transducers in relation to each other so as to define at least two end fire arrays; and
   b) producing an angular separation between the longitudinal axis of acoustic beams produced by said end fire arrays in accordance with the physical relationship between said at least two end fire arrays, the angular separation of said beams providing for the angular positional resolution of objects located at distances from the end of said end fire arrays which are substantially less than the maximum width of said beams through to the far field.

* * * * *